(12) United States Patent
Minamibori et al.

(10) Patent No.: US 9,553,284 B2
(45) Date of Patent: Jan. 24, 2017

(54) MOLDING MATERIAL FOR PACKAGE

(71) Applicant: Showa Denko Packaging Co., Ltd., Isehara-shi, Kanagawa (JP)

(72) Inventors: Yuji Minamibori, Hikone (JP); Honglin Wang, Hikone (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 203 days.

(21) Appl. No.: 14/511,285

(22) Filed: Oct. 10, 2014

(65) Prior Publication Data
US 2015/0104593 A1 Apr. 16, 2015

(30) Foreign Application Priority Data
Oct. 15, 2013 (JP) .................. 2013-214344

(51) Int. Cl.
*H01M 2/02* (2006.01)
*B32B 15/08* (2006.01)
(Continued)

(52) U.S. Cl.
CPC .............. *H01M 2/0292* (2013.01); *B32B 7/12* (2013.01); *B32B 15/08* (2013.01); *B32B 15/20* (2013.01); *B32B 27/34* (2013.01); *B32B 27/36* (2013.01); *H01M 2/0287* (2013.01); *B32B 2255/10* (2013.01); *B32B 2255/26* (2013.01); *B32B 2307/518* (2013.01); *B32B 2307/554* (2013.01); *B32B 2307/584* (2013.01); *B32B 2307/714* (2013.01); *B32B 2307/7242* (2013.01); *B32B 2439/70* (2013.01); *B32B 2439/80* (2013.01); *Y10T 428/1352* (2015.01);
(Continued)

(58) Field of Classification Search
None
See application file for complete search history.

(56) References Cited

U.S. PATENT DOCUMENTS 4,345,004 A * 8/1982 Miyata ................... B05D 7/148
156/330
5,304,617 A * 4/1994 Kodama ............. C08F 214/188
526/242
(Continued)

FOREIGN PATENT DOCUMENTS

JP 2000-123799 A 4/2000
JP 200418774 A * 1/2004
(Continued)

*Primary Examiner* — Rena D Cronin
(74) *Attorney, Agent, or Firm* — Keating and Bennett, LLP

(57) ABSTRACT

A molding material for package includes a matte-coating layer having excellent formability, chemical resistance, solvent resistance, electrolytic solution resistance and printing property. The molding material for package includes an outer base material layer including a heat-resistant resin; an inner sealant layer including a thermoplastic resin; a metal foil layer disposed between the outer base material layer and the inner sealant layer; and a matte-coating layer formed on a side opposite to the metal foil layer of the outer base material layer, wherein the matte-coating layer is a multilayer including a bottom layer including a resin composition including a main agent resin including a phenoxy resin and a urethane resin, a curing agent, and solid fine particles; and an upper layer including a resin composition including a fluorine-containing resin.

10 Claims, 2 Drawing Sheets

(51) Int. Cl.
  *B32B 7/12*   (2006.01)
  *B32B 15/20*   (2006.01)
  *B32B 27/34*   (2006.01)
  *B32B 27/36*   (2006.01)

(52) U.S. Cl.
  CPC .......... *Y10T 428/25* (2015.01); *Y10T 428/265* (2015.01); *Y10T 428/3154* (2015.04)

(56) References Cited

U.S. PATENT DOCUMENTS

| | | | |
|---|---|---|---|
| 7,153,563 B2* | 12/2006 | Shoshi | C08J 7/047 428/220 |
| 2006/0288648 A1* | 12/2006 | Thurber | B24D 3/28 51/295 |
| 2009/0220795 A1* | 9/2009 | Connelly | C08G 18/792 428/414 |
| 2012/0135301 A1* | 5/2012 | Akita | H01M 2/0212 429/185 |
| 2014/0087241 A1 | 3/2014 | Kuramoto et al. | |
| 2014/0205894 A1 | 7/2014 | Akita et al. | |

FOREIGN PATENT DOCUMENTS

| | | |
|---|---|---|
| JP | 2011-054563 A | 3/2011 |
| WO | 2011/016506 A1 | 2/2011 |
| WO | 2012/133663 A1 | 10/2012 |
| WO | 2013/069730 A1 | 5/2013 |

\* cited by examiner

MOLDING MATERIAL FOR PACKAGE

TECHNICAL FIELD

The present invention relates to a molding material for package and a molded case, which are preferably used as a case for, for example, a laptop personal computer, a cell phone, a vehicle, or a stationary lithium ion secondary battery and are also preferably used as a package material for food or a medicine.

TECHNICAL BACKGROUND

As the molding material for package, package materials are known that are obtained by placing a metal foil layer, which is a barrier layer between an outer layer comprising a heat-resistant resin and an inner layer comprising a thermoplastic resin, and integrally laminating them (see Patent Documents 1 to 5).

In a package material described in Patent Document 2 and 3, the outer layer is subjected to a matting treatment or a matte-coating layer is provided on the outer layer to improve formability and durability. They also describe that an appearance quality of the package material is improved and the adhesion between the package materials is prevented to make the handling easier by the formation of the matte-coating layer.

Patent Document 4 describes that the matte-coating layer exhibits a delustering effect and decreases defective formation in a forming step, a sliding property can be controlled by controlling the amount of a lubricant added, and the delustering effect can be controlled by controlling the particle size and the addition amount of a matting agent.

Patent Document 5 describes that an epoxy resin is used for the matte-coating layer to prevent whitening of a base material layer and occurrence of poor appearance due to resin cracks during the formation.

The matte-coating layer comprises a resin composition in which solid fine particles are dispersed in a resin, and the resin may include an acrylic resin, a urethane resin, an alkyd resin, a fluorine-containing resin, and the like, and the solid fine particles may include silica, kaolin, and the like.

PRIOR ART DOCUMENTS

Patent Documents

Patent Document 1: Japanese Unexamined Patent Application Publication No. 2000-123799
Patent Document 2: WO 2012/133663 A1
Patent Document 3: Japanese Unexamined Patent Application Publication No. 2011-054563
Patent Document 4: WO 2011/016506 A1
Patent Document 5: WO 2013/069730 A1

SUMMARY OF INVENTION

Problems to be Solved by the Invention

Each of the resins used in the matte-coating layers described above are characterized as follows:

The urethane resin is soft and can provide good formability, but has poor chemical resistance and solvent resistance. As for a package material for a secondary battery case, there is a risk in which an electrolytic solution may adhere to an outer layer of the package material during the production steps of the battery, and thus the matte-coating layer thereof, which is the outermost layer of the case, requires to have chemical resistance and solvent resistance in order to prevent the reduction of the appearance quality caused by adhesion of an electrolytic solution.

The fluorine-containing resin has excellent chemical resistance and solvent resistance, but has a poor adhesive property of a printing ink, whereby letters or bar codes printed on a product surface may sometimes spread.

Means to Solve the Problems

In view of the background art described above, the present invention aims at providing a molding material for package, which has a matte-coating layer having excellent formability, chemical resistance, solvent resistance, and printing property, and related technologies.

The present invention has constituent features [1] to [10] described below:

[1] A molding material for package comprising: an outer base material layer comprising a heat-resistant resin; an inner sealant layer comprising a thermoplastic resin; a metal foil layer disposed between the outer base material layer and the inner sealant layer; and a matte-coating layer formed on a side opposite to the metal foil layer side of the outer base material layer, wherein
the matte-coating layer is a multilayer including a bottom layer comprising a resin composition including a main agent resin including a phenoxy resin and a urethane resin, a curing agent, and solid fine particles; and an upper layer comprising a resin composition including a fluorine-containing resin.

[2] The molding material for package according to item 1 above, wherein the fluorine-containing resin in the resin composition forming the upper layer of the matte-coating layer includes, as a main component, a heat-resistant resin in which fluorine is added to a backbone of a main agent.

[3] The molding material for package according to items 1 or 2 above, wherein the fluorine-containing resin in the resin composition forming the upper layer of the matte-coating layer includes, as a main component, a two-component curing type fluororesin comprising a copolymer of a tetrafluoroolefin and a vinyl carboxylate.

[4] The molding material for package according to any one of items 1 to 3 above, wherein the bottom layer of the matte-coating layer has a thickness of 2 to 5 μm.

[5] The molding material for package according to any one of items 1 to 4 above, wherein the upper layer of the matte-coating layer has a thickness of 0.2 to 2 μm.

[6] The molding material for package according to any one of items 1 to 5 above, wherein the main agent resin in the resin composition forming the bottom layer of the matte-coating layer includes the phenoxy resin and the urethane resin in a mass ratio of 0.6 to 1.6 of the urethane resin relative to 1 of the phenoxy resin.

[7] The molding material for package according to any one of items 1 to 6 above, wherein the solid fine particles in the resin composition forming the bottom layer of the matte-coating layer have an average particle size of 1 to 5 μm.

[8] The molding material for package according to any one of items 1 to 7 above, wherein the resin composition forming the bottom layer of the matte-coating layer includes the solid fine particles in a content of 1 to 50% by mass.

[9] A molded case obtained by subjecting the molding material for package according to any one of items 1 to 8 above to deep-drawing or stretch-forming.

[10] The molded case according to item 9 above, which is used as a case for a battery.

Effects of the Invention

According to the invention described in [1], the mixed resin of the phenoxy resin having high stability and the urethane resin having high flexibility is used as the main agent resin of the resin component in the resin composition forming the bottom layer of the matte-coating layer, and thus a molding material for package, having excellent formability, chemical resistance, and solvent resistance can be provided. In addition, the fluorine-containing resin forming the upper layer of the matte-coating layer has a resin having excellent electrolytic solution resistance and abrasion resistance, and thus the electrolytic solution resistance and the abrasion resistance of the matte-coating layer are high. Furthermore, the upper layer reduces surface unevenness caused by the solid fine particles in the bottom layer, and thus a good printing property can be obtained.

According to the invention described in each [2] and [3], particularly excellent electrolytic solution resistance and abrasion resistance can be obtained.

According to the invention described in [4], the bottom layer of the matte-coating layer can be made good in both the formability and the coating property.

According to the invention described in [5], the upper layer of the matte-coating layer can be made particularly excellent in the formability, the printing property, the electrolytic solution resistance and the abrasion resistance.

According to the invention described in [6], the matte-coating layer having a particularly excellent balance in the formability, the electrolytic solution resistance and the solvent resistance can be obtained owing to the mixing ratio of the phenoxy resin and the urethane resin in the main agent resin.

According to the invention described in [7], the particle size of the solid fine particles included in the resin composition is defined to a pre-determined range, and thus the matte-coating layer having particularly excellent formability can be obtained.

According to the invention described in [8], the content of the solid fine particles in the resin composition is defined to a predetermined range, and thus the matte-coating layer having particularly excellent formability and a good appearance can be obtained.

According to the invention described in [9], the molded case having good formability, chemical resistance, solvent resistance, and electrolytic solution resistance and further a good printing property can be provided.

According to the invention described in [10], the battery case having good formability, chemical resistance, solvent resistance, and electrolytic solution resistance and further a good printing property can be provided.

PREFERRED EMBODIMENTS FOR CARRYING OUT THE INVENTION

Molding Material for Package

Figure 1:
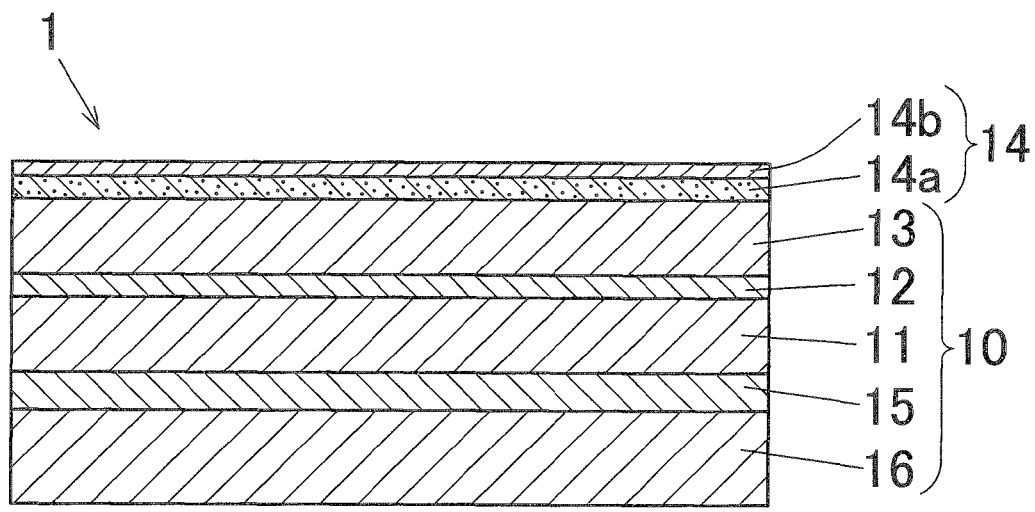
FIG. 1 is a cross-sectional view showing one embodiment of a molding material for package according to the present invention.

FIG. 1 shows one embodiment of molding material for package (1) according to the present invention. The molding material for package (1) is used as a package material for a lithium ion secondary battery case, i.e., the molding material for package (1) is subjected to molding such as deep-drawing and the resulting product is used as the secondary battery case.

The molding material for package (1) has a structure in which an outer base material layer (13) is laminated on and integrated with one side of a metal foil layer (11) through an outer adhesive layer (12), and a matte-coating layer (14) having a two-layer structure is formed on an outer surface of the outer base material layer (13), i.e., a side opposite to the metal foil layer (11). In addition, an inner sealant layer (16) is laminated on and integrated with the other side of the metal foil (11) through an inner adhesive layer (15).

Each layer is described in detail below:
(Outer Base Material Layer)

The outer base material layer (13) is formed of a heat-resistant resin, and the kind of the resin is not particularly limited. The resin may include, for example, polyamide films, polyester films, and the like. Stretched films thereof are preferably used. Of these, it is particularly preferable to use a biaxially stretched polyamide film, a biaxially stretched polybutylene terephthalate (PBT) film, a biaxially stretched polyethylene terephthalate (PET) film, or a biaxially stretched polyethylene naphthalate (PEN) film, in terms of formability and strength. The polyamide film is not particularly limited, and examples thereof may include Nylon-6 films, Nylon-6,6 films, MXD Nylon films, and the like. The outer base material layer (13) may be formed in a monolayer or a multilayer formed of, for example, a PET film/a polyamide film.

The outer base material layer (13) has preferably a thickness of 9 μm to 50 μm. When a polyester film is used, the thickness thereof is preferably from 9 μm to 50 μm. When a polyamide film is used, the thickness thereof is preferably from 10 μm to 50 μm. When the thickness is set at the preferable lower limit or more, a strength sufficient for the package material can be secured, and when the thickness is set at the preferable upper limit or less, the stress applied during the stretch-forming or the drawing can be reduced, and thus resulting in the improved formability.
(Inner Sealant Layer)

The inner sealant layer (16) is formed of a thermoplastic resin, and has an excellent chemical resistance to such as a highly corrosive electrolytic solution, which is used in a lithium ion secondary battery and plays a role to provide heat sealing property to a package material.

The thermoplastic resin which forms the inner sealant layer (16) is not particularly limited, and an unstretched thermoplastic resin film is preferable. The unstretched thermoplastic resin film is not particularly limited, and unstretched films formed of at least one thermoplastic resin selected from the group consisting of polyethylene, polypropylene, olefin copolymers, these polymers modified with an acid, and ionomers thereof are preferable in terms of the chemical resistance and the heat-sealing property.

It is preferable to set the thickness of the inner sealant layer (16) to 20 μm to 80 μm. When the thickness is set at 20 μm or more, generation of pin holes can be sufficiently prevented, and when it is set at 80 μm or less, the amount of the resin used can be reduced, and thus the cost reduction can also be attempted. It is particularly preferable to set the thickness of the inner sealant layer (16) at 30 µm to 50 µm. The inner sealant layer (16) may be a monolayer or a multilayer.

(Metal Foil Layer)

The metal foil layer (11) plays a role to provide a gas barrier property for preventing invasion of oxygen or water into the molding material for package (1).

The metal foil layer (11) is not particularly limited, and examples thereof may include aluminum foil, copper foil, nickel foil, stainless steel foil, a clad foil thereof, an annealed or non-annealed foil thereof, and the like. In addition, it is preferable to use a metal foil which is plated with an electric conductive metal such as nickel, tin, copper, or chromium, for example, a plated aluminum foil. The metal foil layer (11) has preferably a thickness of 20 µm to 100 µm. When the thickness is 20 µm or more, the pin hole generation, caused upon rolling a metal foil when it is produced, can be prevented, and when it is 100 µm or less, the stress applied during the stretch-forming or the drawing can be reduced, and thus resulting in the improved formability.

It is also preferable that a chemical conversion coating film is formed on the surface of the metal foil layer (11). The outer layer and the inner layer of the molding material for package (1) are resin layers, but there is a risk in which a slight amount of light, oxygen, and liquid may enter from the outside of a case, and contents (electrolytic solution of a battery, food, a medicine, or the like) may enter from the inside thereof. When these entering things reach the metal foil layer (11), they cause the corrosion of the metal foil layer (11). Against such a phenomenon, if the highly corrosion-resistant chemical conversion coating film is formed on the surface of the metal foil layer (11), the corrosion-resistance of the metal foil layer (11) can be improved.

The chemical conversion coating film is a coating film formed by subjecting a metal foil surface to a chemical conversion treatment, and it can be formed by subjecting the metal foil to, for example, a chromate treatment or a non-chromate chemical conversion treatment using a zirconium compound. For example, when the chromate treatment is performed, a solution including any of mixtures 1) to 3) described below is coated on a surface of a metal foil, which has been degreased, and then the resulting foil is dried.

1) a mixture of phosphoric acid, chromic acid, and at least one of a metal salt of fluoride and a non-metal salt of fluoride;

2) a mixture of phosphoric acid, one of an acrylic resin, a chitosan derivative resin, and a phenol resin, and at least one of a chromic acid and a chromium (III) salt, and 3) a mixture of phosphoric acid, one of an acrylic resin, a chitosan derivative resin, and a phenol resin, at least one of a chromic acid and a chromium (III) salt, and at least one of a metal salt of fluoride and a non-metal salt of fluoride.

The chemical conversion coating film has preferably a deposit of chromium of 0.1 to 50 mg/m$^2$, and particularly preferably 2 to 20 mg/m$^2$. The chemical conversion coating film having such a deposit of chromium can provide the highly corrosion-resistant molding material for package.

(Outer Adhesive Layer)

The outer adhesive layer (12) is a layer which plays a role to stick the metal foil layer (11) to the outer base material layer (13).

The adhesive forming the outer adhesive layer (12) is not particularly limited, and examples thereof may include two-component curing type urethane adhesives including a polyol component and an isocyanate component, and the like. The two-component curing type urethane adhesive is particularly preferably used when the adhesion is performed by a dry laminating method. The polyol component is not particularly limited, and examples thereof may include polyester polyol, polyether polyol, and the like. The isocyanate component is not particularly limited, and examples thereof may include diisocyanates such as TDI (tolylene diisocyanate), HDI (hexamethylene diisocyanate), MDI (methylene bis(4,1-phenylene)diisocyanate), and the like. It is preferable to set the thickness of the outer adhesive layer (12) at 2 µm to 5 µm, especially 3 µm to 4 µm.

An inorganic or organic anti-blocking agent or an amide slipping agent may be added to the resin forming the outer adhesive layer (12) within a range where the effects of the present invention are not impaired.

(Inner Adhesive Layer)

The inner adhesive layer (15) is a layer which plays a role to stick the metal foil layer (11) to the inner sealant layer (16).

The inner adhesive layer (15) is not particularly limited, and examples thereof may include an adhesive layer formed of a polyurethane adhesive, an acrylic adhesive, an epoxy adhesive, a polyolefin adhesive, an elastomer adhesive, a fluorine adhesive, or the like. Of these, it is preferable to use the acrylic adhesive or the polyolefin adhesive. In such a case, the electrolytic solution resistance and water vapor barrier property of the package material (1) can be improved.

(Matte-Coating Layer)

The matte-coating layer (14) is a layer, which is formed on the outer surface of the outer base material layer (13), and provides a good sliding property to the surface of the molding material for package (1) to improve the formability and provides the excellent chemical resistance, abrasion resistance, and formability thereto. The matte-coating layer (14) has a multilayer structure including a bottom layer (14*a*) on the side of the outer base material layer (13), and an upper layer (14*b*) on the surface side.

(Bottom Layer of Matte-Coating Layer)

The bottom layer (14*a*) is formed of a resin composition including a resin component and solid fine particles.

As the resin component in the resin composition, a main agent resin including a phenoxy resin and a urethane resin, and a curing agent are used.

In the main agent resin, the urethane resin has flexibility and excellent formability, but has insufficient chemical resistance and solvent resistance. On the other hand, the phenoxy resin is a linear high molecular weight compound synthesized from a bisphenol and epichlorohydrin, which is tough, and has stability and excellent heat-stability at a wide range of processing temperature. As the phenoxy resin has OH groups in its structure, the resin has an excellent adhesive property and chemical resistance by cross-linking. The phenoxy resin having such characteristics has excellent chemical resistance and solvent resistance, but its flexibility is inferior to that of the urethane resin. In the present invention, the resin composition having formability, chemical resistance, and solvent resistance can be obtained by using, as the main agent resin, a mixture of the two kinds of resins whose characteristics are contrary to each other, i.e., the urethane resin having high flexibility and the phenoxy resin having high chemical resistance and solvent resistance. As the phenoxy resin, either a bisphenol A phenoxy resin or a bisphenol F phenoxy resin may be used, and they may be used as a mixture thereof. It can be recommended to use the bisphenol A phenoxy resin because of the excellent solvent resistance.

The urethane resin has a particularly excellent printing property and the phenoxy resin has also a good printing property, and thus the mixed resin thereof has a good printing property.

The flexibility of the main agent resin increases and thus the formability is improved as the urethane resin content increases, but the chemical resistance and the solvent resistance are reduced because the phenoxy resin content relatively decreases. To the contrary, the chemical resistance and the solvent resistance are improved as the phenoxy resin content increases, but the degree of improvement of the formability decreases because the urethane resin content relatively decreases. In the present invention, the mixing ratio in the main agent resin is not limited, and a mass ratio of the urethane resin within a range of 0.6 to 1.6 relative to 1 of the phenoxy resin can be recommended as a mixing ratio having a good balance in the formability, the chemical resistance, and the solvent resistance, and the particularly preferable mass ratio of the urethane resin is within a range of 0.8 to 1.4 relative to 1 of the phenoxy resin.

The curing agent is not particularly limited, and it is preferable to use an isocyanate component. The isocyanate component may include, for example, diisocyanates such as TDI (tolylene diisocyanate), HDI (hexamethylene diisocyanate), and MDI (methylene bis(4,1-phenylene) diisocyanate), and the like. They may be used alone or as a mixture of two or more kinds.

It is preferable to admix the curing agent in an amount of 5 to 50 parts by mass relative to 100 parts by mass of the main agent resin. When the amount is less than 5 parts by mass, the adhesion property to the outer base material layer (13) and the solvent resistance may be reduced. When it is more than 50 parts by mass, the bottom layer (14a) becomes hard, and thus the printing property and the formability may be reduced. The particularly preferable amount of the curing agent added is from 10 to 40 parts by mass relative to 100 parts by mass of the main agent resin.

It is preferable as the physical property of the resin component comprising the main agent resin and the curing agent that a viscosity of the liquid having a solid concentration of 25% by mass, measured at 20° C. using a Zahn cup #4, is within a range of 10 to 30 seconds, and particularly preferably a range of 15 to 25 seconds.

The present invention does not exclude the use of resins and additives other than the phenoxy resin and the urethane resin, and other components may be added so long as the formability, the chemical resistance, and the solvent resistance are not impaired.

In the resin composition, the solid fine particles are a component which is added for providing the sliding property to the bottom layer (14a) of the matte-coating layer to improve the formability. In addition, it becomes difficult to stick the package materials to each other by adding the solid fine particles to improve the handling, and further an effect of making quiet appearance whose resin glossy is suppressed can be obtained.

As the solid fine particles capable of exhibiting such effects, either inorganic fine particles or organic fine particles can be used, and they may also be used as a mixture thereof. As the inorganic fine particles, one or more kinds of silica, alumina, calcium oxide, calcium carbonate, calcium sulfate, calcium silicate, and carbon black may be used. Of these, it is preferable to use silica. As the organic fine particles, fine particles of an acrylic ester compound, a polystyrene compound, an epoxy resin, a polyamide compound, or a cross-linked product thereof may be used.

It is preferable to use the fine particles having an average particle size of 1 µm to 6 µm, especially 2 µm to 5 µm, because a good sliding property is obtained in the particle size range. When fine particles having a too small particle size of less than 1 µm are used, the particles are buried in the coating liquid, and the addition of a large amount of the fine particles is necessary for realizing the desired properties, and only insufficient sliding property can be obtained. When fine particles having a large particle size of more than 6 µm are used, the particle size is beyond the thickness of the coating, and thus the particles easily drop.

Figure 2:
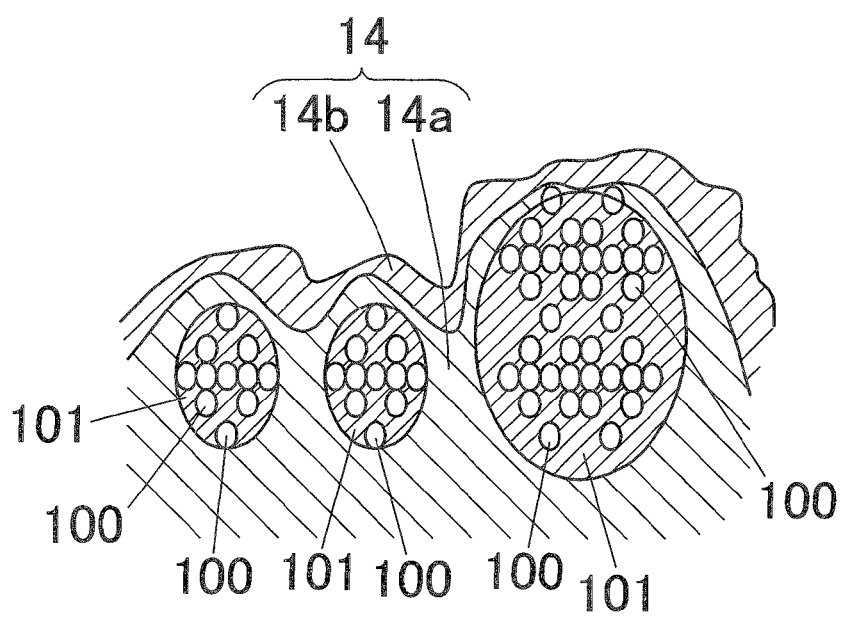
FIG. 2 is a schematic view illustrating aggregation of solid fine particles in a matte-coating layer.

When silica is used as the solid fine particles, secondary particles having a particle size range described above formed by aggregation of primary particles having a particle size of several nm may be used. FIG. 2 shows a state in which multiple primary particles (100) are aggregated into secondary particles (101).

The content of the solid fine particles in the resin composition is decided from a range of 1 to 50% by mass depending on the degree of a desired sliding property of a package material, and the particle size and the kind of fine particles added. When the content is less than 1% by mass, the effect of improving the sliding property is low, and thus the effect of improving the formability may be insufficiently obtained. When it is too high such as more than 50% by mass, the spoiled appearance is concerned. The preferable content of the fine particles is within a range of 10 to 45% by mass, particularly preferably 20 to 40% by mass. When silica is used as the inorganic fine particles, an optimum sliding property can be obtained when the particle size and the content are within the upper and lower limit range.

The bottom layer (14a) of the matte-coating layer preferably has a thickness of 2 to 5 µm after curing. A layer which is thinner than the lower limit described above has a small effect of improving the sliding property, and has a reduced delustering feeling, while it is difficult to make the thickness of the bottom layer (14a) thicker than the upper limit. The particularly preferable thickness is within a range of 2.5 to 4 µm.

(Upper Layer of Matte-Coating Layer)

The upper layer (14b) of the matte-coating layer (14) is a layer which further improves the sliding property of the surface to improve the formability, and provides the more excellent electrolytic solution resistance and abrasion resistance. In addition, it has the effect of improving the printing property by reducing the surface unevenness caused by the solid fine particles in the bottom layer (14a).

The upper layer (14b) is formed of a resin composition including a fluorine-containing resin.

It is preferable to use a resin in which fluorine is added to the backbone of the main agent as the fluorine-containing resin, and when such a resin is used, particularly excellent electrolytic solution resistance and abrasion resistance can be obtained. As the resin in which fluorine is added to the backbone of the main agent, for example, two-component curing type resins such as a copolymer of tetrafluoroolefin and vinyl carboxylate, a copolymer of tetrafluoroolefin and an alkyl vinyl ether, a copolymer of a chlorotrifluoroolefin and vinyl carboxylate, and a copolymer of a chlorotrifluoroolefin and an alkyl vinyl ether may be used. Of these fluorine-containing resins, the copolymer of the tetrafluoroolefin and a vinyl carboxylate can be preferably used. A urethane resin and/or an acrylic resin may be added to the fluorine-containing resin to further improve the strength and the formability.

It is recommended to use the same curing agent as used in the bottom layer (14a) when the two-component curing type fluorine-containing resin is used. The addition amount thereof is preferably within a range of 5 to 50 parts by mass, from the same reasons as above.

The present invention does not exclude the use of resins and additives other than the fluorine-containing resin and the curing agent as the components of the resin composition for the upper layer, and other components may be added so long as the properties of the upper layer are not impaired.

The upper layer (14b) preferably has a thickness of 0.2 to 2 µm after curing. When the layer is thinner than the lower limit, the effect of improving the formability, the electrolytic solution resistance, and the abrasion resistance is decreased. When the upper layer (14b) is too thin, the effect of reducing the surface unevenness caused by the solid fine particles in the bottom layer (14a) is decreased, and thus the effect of improving the printing property is also decreased. On the other hand, when the layer is thicker than the upper limit, the delustering feeling caused by the bottom layer (14a) may be reduced. The particularly preferable thickness is within a range of 0.5 to 1.5 µm.

The thickness of the bottom layer (14a) or the upper layer (14b) is obtained by calculation from a solid weight of the resin coated, defining the density as 1 g/cm$^3$.

(Production of Molding Material for Package)

The molding material for package (1) having the layers described above can be produced by bonding the outer base material layer (13) to one side of the metal foil layer (11) through the outer adhesive layer (12) and bonding the inner sealant layer (16) to the other side of the metal foil layer (11) through the inner adhesive layer (15) to produce a 5-layers laminate (10); coating the surface of the outer base material layer (13) of the laminate (10) with a pasty resin composition for the bottom layer (14a) of the matte-coating layer (14), and drying it; and coating the resulting surface with a pasty resin composition for the upper layer (14b), and drying it.

In the production of the laminate (10), the method of bonding the layers is not limited, and can be exemplified by a method called dry laminate. Specifically, an upper surface of the metal foil layer (11), an under surface of the outer base material layer (13), or the both surfaces are coated with the adhesive forming the outer adhesive layer (12), a solvent is evaporated to form a dry coating film, and then the metal foil layer (11) is bonded to the outer base material layer (13). The bonding of the metal foil layer (11) to the inner sealant layer (16) is the same as above, that is, an under surface of the metal foil layer (11), an upper surface of the inner sealant layer (16), or the both surfaces are coated with the adhesive forming the inner adhesive layer (15), a solvent is evaporated to form a dry coating film, and then the metal foil layer (11) is bonded to the inner sealant layer (16). Then, the adhesive is cured according to curing conditions, thereby producing the 5-layers laminate (10). The laminate (10) can also be produced by extruding laminated films having the outer base material layer (13) and the outer layer adhesive layer (12), and the inner sealant layer (16) and the inner adhesive layer (15) by a T-die method, and performing thermocompression bonding of the laminated films to the metal foil layer (11). In addition, different methods may be used for bonding the layers on each surface of the metal foil layer (11).

Separately, a pasty resin composition for the bottom layer (14a) of the matte-coating layer (14), and a pasty resin composition for forming the upper layer (14b) are prepared.

Then, the surface of the outer base material layer (13) of the laminate (10) is coated with the resin composition for the bottom layer (14a) and the resin composition is dried, and the layer is coated with the resin composition for the upper layer (14b) and the resin composition is dried. The method of coating the resin composition is not limited, and can be exemplified by a gravure roll method. When the resin composition is dried, the matte-coating layer (14) having a multilayer structure is formed and the bottom layer (14a) is joined to the outer base material layer (13), whereby the expected molding material for package (1) is produced.

Figure 3:
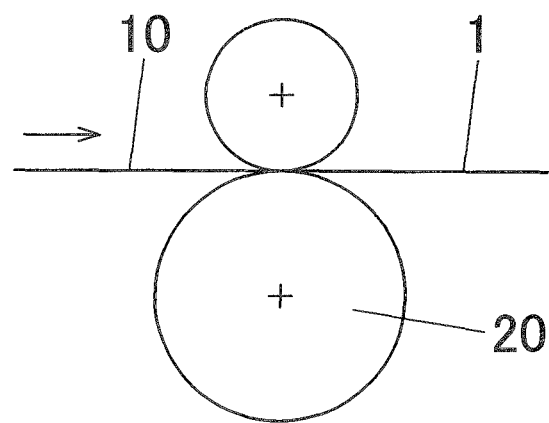
FIG. 3 is an explanation view showing a production step of a molding material for package according to the present invention.

The method of drying the resin composition coated can be exemplified by, as shown in FIG. 3, a method in which the resin composition is heated with a heat roll (20) while the laminate (10) coated with the resin composition is passed through rolls. In this method, a roll brought into contact with the resin composition is set as the heat roll (20), and the roll is heated to a roll temperature, for example, of 130 to 220° C.

In the molding material for package of the present invention, the bonding method of each layer and the forming method of the matte-coating layer are not limited to the methods and the steps described above, and the present invention also encompasses cases where production is performed in other methods or steps.

Molded Case

A molded case (a battery case and the like) can be obtained by molding (deep-drawing, stretch-forming, and the like) the molding material for package (1) of the present invention.

EXAMPLES

Next, Examples of the present invention are specifically described, but the invention is not limited to the Examples.

In Examples 1 to 5, a molding material for package (1) which includes a matte-coating layer having a two-layer structure shown in FIG. 1 was produced. In Comparative Examples 1 and 2, a molding material for package including a matte-coating layer having a monolayer structure was produced. In each of the molding materials for package (1) in Examples and Comparative Examples, only the matte-coating layer is different from others, and materials and production steps of the laminate (10) other than the matte-coating layer are the same in Examples and Comparative Examples.

The materials and the production of the laminate (10) are as follows:

<Laminate>

The metal foil layer (11) is an aluminum foil having a thickness of 35 µm. Both surfaces of the aluminum foil were coated with chemical conversion treatment liquid comprising a polyacrylic acid, a trivalent chromium compound, water, and alcohol, and the resulting foil was dried at 180° C. to form a chemical conversion coating film. The deposit of chromium, owing to the chemical conversion coating film, is 10 mg/m$^2$.

One surface of the metal foil layer (11), on which the chemical conversion coating film was formed, was dry-laminated with a biaxially stretched Nylon-6 film having a thickness of 15 µm as the outer base material layer (13) and a two-component curing type urethane adhesive as the outer adhesive layer (12).

A maleic acid-modified polypropylene resin, which has adhesiveness with both of the metal foil layer (11) and polypropylene, as the adhesive for the inner adhesive layer (15), and an ethylene-propylene random-copolymer resin having a melting temperature of 140° C. and an MFR of 7 g/10 minutes as the inner sealant layer (16) were extruded by the T-die method to prepare a laminated film, which has the 7 μm maleic acid-modified polypropylene resin layer and the 28 μm ethylene-propylene random-copolymer layer. The laminated film is a film in which the inner sealant layer (16) and the inner adhesive layer (15) are laminated.

Subsequently, the inner adhesive layer (15) of the laminated film was put on the other surface of the metal foil layer (11), and which was passed through a heat roll heated to 150° C. to obtain a laminate (10).

Using the produced laminate (10) in common, a molding material for package was produced in each of Examples and Comparative Examples.

Examples 1 to 5

A resin composition described below was prepared for the bottom layer (14a) of the matte-coating layer (14).

A phenoxy resin and a urethane resin were mixed in a mass ratio of 1:1.2 to give the main agent resin, tolylene diisocyanate (TDI) and hexamethylene diisocyanate (HDI) were mixed in a mass ratio of 1:1 to give the curing agent, and a mixture of 100 parts by mass of the main agent resin with 15 parts by mass of the curing agent was diluted with a solvent (toluene) to give the resin component. The viscosity of the resin component was measured at 20° C. using a Zahn cup #4, and it was found that the viscosity was 15 seconds. The resin composition for the bottom layer was produced by adding silica having an average particle size of 2 μm to the resin component described above in a content of 20% by mass, and uniformly dispersing the silica in the resin.

For the upper layer (14b) of the matte-coating layer (14), a resin composition described below was prepared.

A two-component curing type resin composition including a copolymer of tetrafluoroethylene and vinyl acetate was used as the main agent resin, and a mixture of tolylene diisocyanate (TDI) and hexamethylene diisocyanate (HDI) in a mass ratio of 1:1 was used as the curing agent. A mixture of 100 parts by mass of the main agent resin with 18 parts by mass of the curing agent was diluted with a solvent (toluene) to give a resin composition for the upper layer.

The thicknesses of the bottom layer (14a) and the upper layer (14b) were controlled by controlling the dilution ratio of the curing agent and the coating amount. Methyl ethyl ketone may also be used as the solvent of the curing agent.

The matte-coating layer (14) was formed by coating the laminate (10) with the materials described above using two coaters in a multicolor printing machine. First, the outer base material layer (13) of the laminate (10) was coated with the resin composition for the bottom layer twice in succession using a gravure roll, and which was dried to form the bottom layer (14a). Next, the laminate (10) on which the bottom layer (14a) was formed was passed through the multicolor printing machine again, whereby the resulting surface was coated with the resin composition for the upper layer twice in succession using the gravure roll, and which was dried to form the upper layer (14b). The matte-coating layer (14), which had a two-layer structure including the bottom layer (14a) and the upper layer (14b), was formed by the steps described above to obtain a molding material for package (1).

The dried bottom layer (14a) and the dried upper layer (14b) had thicknesses shown in Table 1.

Comparative Example 1

Comparative Example 1 is an example of a monolayered matte-coating layer, formed of only the bottom layer (14a) including the solid fine particles.

For the bottom layer (14a), a resin composition described below was prepared.

A two-component curing type resin composition including a copolymer of tetrafluoroethylene and vinyl acetate was used as the main agent resin, a mixture of tolylene diisocyanate (TDI) and hexamethylene diisocyanate (HDI) in a mass ratio of 1:1 was used as the curing agent, and a mixture of 100 parts by mass of the main agent resin with 18 parts by mass of the curing agent diluted with a solvent (toluene) was used as the resin component. The resin composition for the bottom layer was produced by adding silica having an average particle size of 2 μm to the resin component described above in a content of 20% by mass, and uniformly dispersing the silica in the resin. The thickness control was performed by controlling the dilution ratio of the curing agent and the coating amount, as in Examples.

The laminate (10) was coated with the bottom layer resin composition obtained above twice in succession using the multicolor printing machine, and the resulting laminate was dried, as in Examples, to form a monolayer matte-coating, whereby a molding material for package was obtained.

The thickness of the dried bottom layer (14a) described above is as shown in Table 1.

Comparative Example 2

Comparative Example 2 is an example of a monolayered matte-coating layer, formed of only the bottom layer (14a) including the solid fine particles, and is different from Comparative Example 1 in the resin component of the resin composition for the bottom layer.

As the resin composition for the bottom layer (14a), the same resin composition for the bottom layer as used in Examples 1 to 5 was used; that is, a phenoxy resin and a urethane resin were mixed in a mass ratio of 1:1.2 to give the main agent resin, tolylene diisocyanate (TDI) and hexamethylene diisocyanate (HDI) were mixed in a mass ratio of 1:1 to give the curing agent, and a mixture of 100 parts by mass of the main agent resin with 15 parts by mass of the curing agent was diluted with a solvent (toluene) to give the resin component. The resin composition for the bottom layer was produced by adding silica having an average particle size of 2 μm to the resin component described above in a content of 20% by mass, and uniformly dispersing the silica in the resin.

As for each of the molding materials for packages obtained as above, performance evaluations were performed based on the following evaluation methods. The results are shown in Table 1.

<Evaluation of Formability>

Using a stretch-forming machine (Article Number: TP-25C-X2), manufactured by Amada Co., Ltd., the molding material for package was subjected to stretch-forming to obtain a rectangular parallelepiped with a length of 55 mm×a width of 35 mm×a depth of 8 mm. Rounded portions at the corners of the molded article were observed about pin holes and cracks, and the formability was evaluated in accordance with the following evaluation criteria:

(Evaluation Criteria)

◎: Neither pin holes nor cracks was generated at all.

○: There was no pin holes at all, but the matte-coating layer slightly whitened.

Δ: There were substantially few pin holes, though a slight number of pin holes were observed only in a few parts.

x: Pin holes and cracks were generated on the rounded portions at the corners.

<Evaluation of Printing Property>

A bar code was printed on the surface of the matte-coating layer with a white ink using an ink-jet printer. The dot size of the printed ink-jet parts was 0.428 mm in a diameter, and the bar code size was 4.5 mm×3.5 mm. Whether or not the bar code could be read by a bar code reader, and the presence or absence of bleeding of the dots and lines were visually observed and evaluated.

(Evaluation Criteria)

◎: Readable and no bleeding

○: Readable but a slight presence of bleedings

Δ: Readable but presence of bleedings x: Unreadable and presence of bleedings

<Evaluation of Abrasion Resistance>

The molding material for package was cut into a test piece having a size of 10 cm×10 cm. The matte-coating layer (14) of the test piece was rubbed by repeating a back-and-forth motion of a sliding tool, that was a counterweight having a tip diameter of 1 cm and a weight of 1 kg around which a sand paper (roughness: 800) was wound, at most 50 times on the test piece, and the abrasion resistance was evaluated by visually observing the appearance thereof.

(Evaluation Criteria)

When the matte layer disappeared and the glossy Nylon underslab was observed, it was defined that the change was observed.

◎: No change in the appearance was observed even when the back-and-forth motion was repeated 50 times.

○: Change in the appearance was observed when the back-and-forth motion was repeated 30 times.

Δ: Change in the appearance was observed when the back-and-forth motion was repeated 10 times.

x: Change in the appearance was observed when the back-and-forth motion was repeated 5 times.

<Evaluation of Electrolytic Solution Resistance>

The molding material for package was cut into a test piece having a size of 10 cm×10 cm. Dropwise 1 ml of an electrolytic solution was added to the matte-coating layer of the test piece, then it was allowed to stand for at most 60 minutes, and was wiped with a cotton swab immersed in ethanol. The electrolytic solution resistance was evaluated by visually observing the appearance of the test piece.

(Evaluation Criteria)

When the matte layer disappeared and the glossy Nylon underslab was observed, it was defined that the change was observed.

◎: No change in the appearance was observed even after 60 minutes.

○: Change in the appearance was observed after 30 minutes.

Δ: Change in the appearance was observed after 20 minutes.

x: Change in the appearance was observed after 10 minutes.

TABLE 1

| | Upper layer | | Bottom layer (including 20% by weight of silica) | | | | | Electrolytic |
|---|---|---|---|---|---|---|---|---|
| | Resin | Thickness (μm) | Main agent resin | Thickness (μm) | Formability | Printing property | Abrasion resistance | solution resistance |
| Example 1 | Fluorine-containing resin | 1.1 | Urethane-phenoxy resin | 3.5 | ◎ | ○ | ○ | ○ |
| Example 2 | Fluorine-containing resin | 0.8 | Urethane-phenoxy resin | 3.5 | ◎ | ○ | ○ | ○ |
| Example 3 | Fluorine-containing resin | 0.65 | Urethane-phenoxy resin | 3.5 | ◎ | Δ | ○ | ○ |
| Example 4 | Fluorine-containing resin | 0.5 | Urethane-phenoxy resin | 3.5 | ◎ | Δ | ○ | ○ |
| Example 5 | Fluorine-containing resin | 0.2 | Urethane-phenoxy resin | 4.0 | ◎ | Δ | ○ | ○ |
| Comparative Example 1 | None | | Fluorine-containing resin | 4.0 | ○ | X | ○ | ○ |
| Comparative Example 2 | None | | Urethane-phenoxy resin | 4.0 | ◎ | Δ | Δ | Δ |

As apparent from the results of the performance evaluations in Table 1, the molding materials for packages from Examples 1 to 5 of the present invention had good formability, printing property, abrasion resistance, and electrolytic solution resistance. On the other hand, in the materials from Comparative Examples 1 and 2 whose matte-coating layers were monolayers, any of the electrolytic solution resistance, printing property, and abrasion resistance was poor.

The present application claims the benefit of priority from Japanese Patent Application No. 2013-214344, filed in the Japan Patent Office on Oct. 15, 2013, and the entire contents of which are incorporated herein by reference.

It should be recognized that the terms and expressions used herein have been presented by way of explanation only, are not intended to limit the scope of the present invention and not intended to exclude any equivalent of the feature matter shown and described herein, but accept various variations in the scope of claims of the present invention.

INDUSTRIAL APPLICABILITY

The molding material for package of the present invention is preferably used for a case of a battery such as a lithium ion secondary battery, a package material for food, and a package material for a medicine.

DESCRIPTION OF SYMBOLS

1 Molding material for package
11 Metal foil layer
12 Outer adhesive layer
13 Outer base material layer
14 Matte-coating layer
14a Bottom layer
14b Upper layer
15 Inner adhesive layer
16 Inner sealant layer

The invention claimed is:

1. A molding material for package comprising:
an outer base material layer comprising a heat-resistant resin;
an inner sealant layer comprising a thermoplastic resin;
a metal foil layer disposed between the outer base material layer and the inner sealant layer; and
a matte-coating layer formed on a side of the outer base material layer that is opposite to another side of the outer base material layer on which the metal foil layer is disposed, wherein
the matte-coating layer includes:
a bottom layer including:
a resin composition including:
a main resin including a phenoxy resin and a urethane resin;
a curing agent; and
solid fine particles; and
an upper layer comprising a resin composition including a fluorine-containing resin.

2. The molding material for package according to claim 1, wherein the fluorine-containing resin in the resin composition forming the upper layer of the matte-coating layer includes a heat-resistant resin in which fluorine is added to a backbone of a main agent.

3. The molding material for package according to claim 1, wherein the fluorine-containing resin in the resin composition forming the upper layer of the matte-coating layer includes a two-component curing type fluororesin comprising a copolymer of a tetrafluoroolefin and a vinyl carboxylate.

4. The molding material for package according to claim 1, wherein the bottom layer of the matte-coating layer has a thickness of 2 to 5 μm.

5. The molding material for package according to claim 1, wherein the upper layer of the matte-coating layer has a thickness of 0.2 to 2 μm.

6. The molding material for package according to claim 1, wherein the main resin in the resin composition forming the bottom layer of the matte-coating layer includes the phenoxy resin and the urethane resin in a mass ratio of 0.6 to 1.6 of the urethane resin relative to 1 of the phenoxy resin.

7. The molding material for package according to claim 1, wherein the solid fine particles in the resin composition forming the bottom layer of the matte-coating layer have an average particle size of 1 to 5 μm.

8. The molding material for package according to claim 1, wherein the resin composition forming the bottom layer of the matte-coating layer includes the solid fine particles in a content of 1 to 50% by mass.

9. A molded case obtained by subjecting the molding material for package according to claim 1 to deep-drawing or stretch-forming.

10. The molded case according to claim 9, which is used as a case for a battery.

* * * * *